(12) United States Patent
Farrell

(10) Patent No.: US 6,902,217 B1
(45) Date of Patent: Jun. 7, 2005

(54) COLLAPSIBLE VEHICULAR ARMREST

(76) Inventor: Martin Farrell, 138 E. Navasink Dr., Little Egg Harbor, NJ (US) 08087

( * ) Notice: Subject to any disclaimer, the term of this patent is extended or adjusted under 35 U.S.C. 154(b) by 0 days.

(21) Appl. No.: 10/888,814

(22) Filed: Jul. 9, 2004

(51) Int. Cl.[7] .............................................. B62D 39/00
(52) U.S. Cl. ..................................... 296/1.09; 296/153
(58) Field of Search ............................. 296/1.09, 153; 248/118, 238, 240

(56) References Cited

U.S. PATENT DOCUMENTS

| | | | | |
|---|---|---|---|---|
| 1,426,787 A | * | 8/1922 | Spencer | 296/153 |
| 1,523,285 A | * | 1/1925 | Pritchett | 296/153 |
| 1,695,549 A | * | 12/1928 | Hausler | 296/153 |
| 2,670,235 A | * | 2/1954 | Susil | 296/153 |
| 2,711,344 A | * | 6/1955 | Larson | 296/153 |
| 3,129,974 A | * | 4/1964 | Vaughn | 296/153 |
| 3,326,600 A | * | 6/1967 | Mathews | 296/153 |
| 3,603,637 A | * | 9/1971 | DePinto | 296/153 |
| 4,592,584 A | * | 6/1986 | White, Jr. | 296/153 |
| 4,805,957 A | | 2/1989 | Fletcher | 296/153 |
| 4,982,921 A | | 1/1991 | Sanders | 248/118 |
| 5,205,606 A | | 4/1993 | Cassese | 296/153 |
| 5,320,401 A | * | 6/1994 | Ott | 296/153 |
| 5,853,218 A | * | 12/1998 | Cox | 296/153 |
| 5,964,497 A | * | 10/1999 | Wiles | 296/153 |
| 2004/0017094 A1 | * | 1/2004 | Bruton | 296/153 |

* cited by examiner

Primary Examiner—Lori L. Coletta
(74) Attorney, Agent, or Firm—Goldstein Law Offices, P.C.

(57) ABSTRACT

An armrest for use with a window crevasse in a door of an automobile. The armrest includes a rectangular base, a central hinge, a rear panel, a pair of braces and a cushion. The base has a front edge, a right side edge, a rear edge and a left side edge. The cushion is located on top of the base and the hinge is mounted along the rear edge between the base and the panel. To install the armrest, a user lowers a window until it is fully recessed in the window crevasse, positions the armrest, inserts the panel into the window crevasse, lifts up the base until it is perpendicular to the door, pushes an upper end of each brace into the cushion until the lower end rests against the door and locks the braces into an extended position.

3 Claims, 2 Drawing Sheets

COLLAPSIBLE VEHICULAR ARMREST

BACKGROUND OF THE INVENTION

1. Field of the Invention

The invention generally relates to an armrest, and in particular it relates to a collapsible armrest that can be readily inserted into the window crevasses of automobiles.

2. Description of the Related Art

Due to a continuous sprawl of urbanization a steadily increasing preference for traveling by automobile, Americans are spending more and more time behind the wheel. It is estimated that the average commuter spends about 1.33 hours per day in a motor vehicle, which is equivalent to almost 14 full days per year. After factoring in driving children to school and recreational activities, necessary trips to the supermarket for supplies and spur-of-the-moment weekend road adventures, these numbers would surely increase. Although cars are essential to day-to-day life almost everywhere in the country, driving can often bring about its own unique variety of stress. Whether a traffic accident has turned a freeway into a veritable parking lot, road construction has closed off a quick shortcut or weather conditions have rendered driving dangerous, a trip to work or school can more often than not seem like a daunting epic journey.

Spending prolonged periods of time behind the wheel can cause physical stress in addition to mental tension. In particular, arms and hands can experience discomfort as they busily operate the steering wheel and the gear shift. It is often necessary to relax these body parts to relieve tension and stress, especially on long trips. Most automobiles are equipped with a fold-down armrest in the center of the front seat. While this soft and padded resting area provides much needed relief for the right arm and hand of the driver, his left appendages can take on additional pressure and consequently experience fatigue, soreness and poor circulation. In order to combat this problem, the driver often lowers his window and places his left arm along the crevasse into which the window retracts. However, this solution is not practical during rain, snow or extremely cold weather and when the internal air conditioning or heating system is activated. Hence, there is a pressing need for an armrest that can be inserted into the window crevasses of an automobile and collapsed against the associated door.

U.S. Pat. No. 4,805,957 to Fletcher ("Fletcher") teaches a flexible armrest for an automobile window sill. However, the armrest of Fletcher does not project into the automobile and consequently requires a user to extend his arm a considerable distance.

U.S. Pat. No. 4,982,921 to Sanders ("Sanders") discloses an automobile window armrest. However, the armrest of Sanders does not project into the automobile and consequently requires a user to extend his arm a considerable distance.

U.S. Pat. No. 5,205,606 to Cassese ("Cassese") teaches an armrest for a window of a motor vehicle. However, the armrest of Cassese is not readily collapsible.

While these devices may be suitable for the particular purposes employed, or for general use, they would not be as suitable for the purposes of the present invention as disclosed hereafter.

SUMMARY OF THE INVENTION

It is an object of the invention to provide an armrest that can support an arm of a driver or a passenger while he is riding in an automobile. Accordingly, the armrest has a rear panel that can be inserted into the window crevasse of a motor vehicle car door and two braces that extend into a cushion and support its weight when locked into position.

It is another object of the invention to provide an armrest that occupies minimal space in its collapsed state. Accordingly, the braces can be substantially withdrawn from the cushion and the cushion can subsequently be folded against the interior of the car door via a central hinge.

It is a further object of the invention to provide an armrest that is portable. Accordingly, the armrest can be removed from a first car door by lifting the panel out of the window crevasse thereof and utilized with a second car door by placing the panel into the window crevasse thereof.

It is a further object of the invention to provide an armrest that does not slide back and forth while in use. Accordingly, the length of the panel is approximately equal to the length of a standard motor vehicle window crevasse.

It is a further object of the invention to provide an armrest that is comfortable. Accordingly, the cushion is fully padded and specifically designed to relax the arm muscles of a user.

The invention is an armrest for use with a window crevasse in a door of an automobile. The armrest includes a rectangular base, a central hinge, a rear panel, a pair of braces and a cushion. The base has a front edge, a right side edge, a rear edge and a left side edge. The cushion is located on top of the base and the hinge is mounted along the rear edge between the base and the panel. To install the armrest, a user lowers a window until it is fully recessed in the window crevasse, positions the armrest, inserts the panel into the window crevasse, lifts up the base until it is perpendicular to the door, pushes an upper end of each brace into the cushion until the lower end rests against the door and locks the braces into an extended position.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
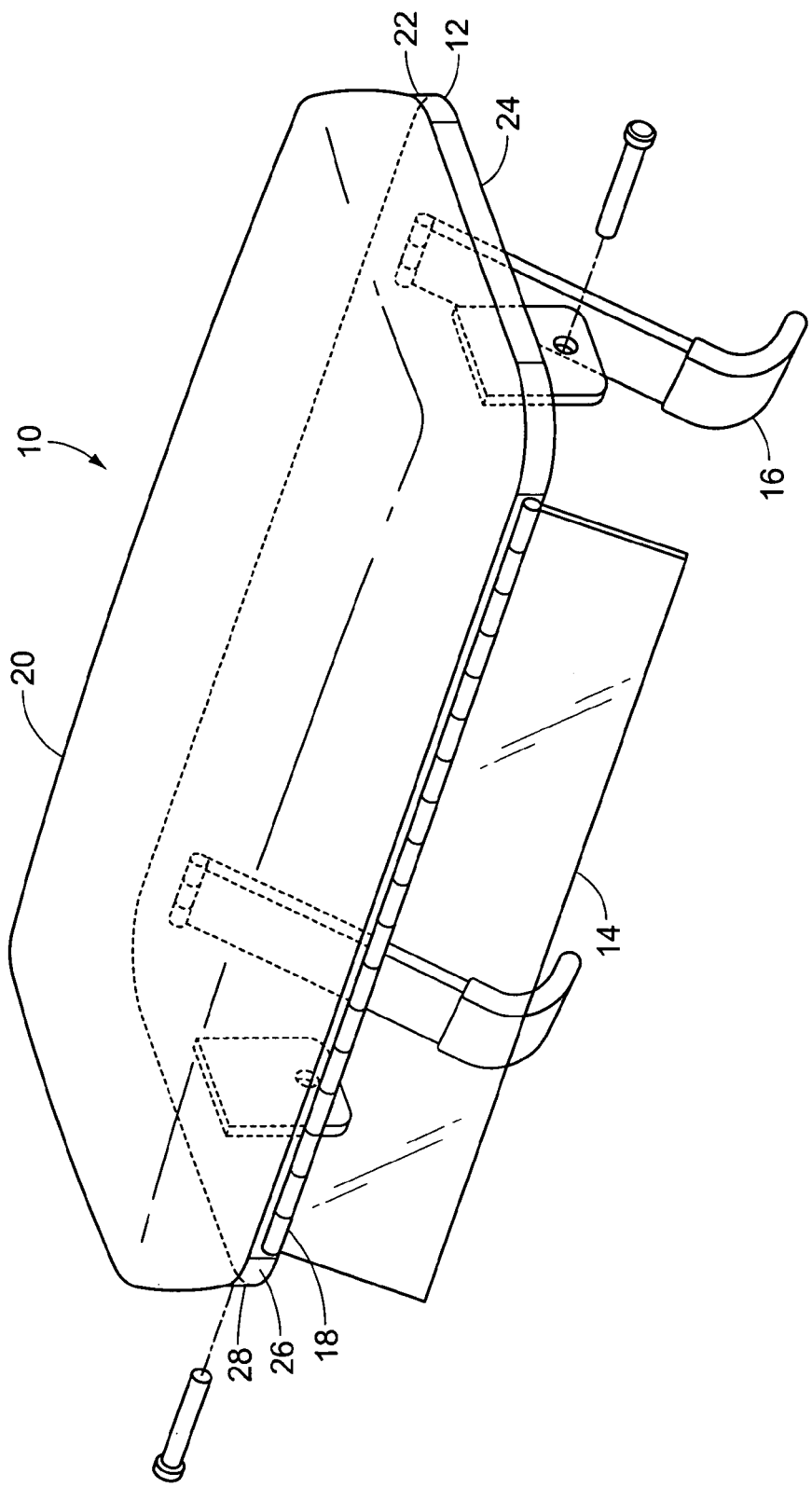
FIG. 1 is a diagrammatic perspective view of an armrest according to the present invention.

FIG. 1 depicts an armrest 10 according to the present invention. The armrest 10 has a frame which consists of a base 12, a central hinge 18, a rear panel 14 and a pair of braces 16. The base 12, which has a generally rectangular configuration, has a front edge 22, a right side edge 28, a rear edge 26 and a left side edge 24. Two rectangular slot-like openings are present on the underside of the base 12 near the rear edge 26. The distance between the left side opening and the left side edge 24 is approximately equal to the distance between the right side opening and the right side edge 28. The central hinge 18 is mounted along the rear edge 26 between the base 12 and the panel 14, and extends for the entire length thereof. The hinge 18 can be of any suitable type and design. The panel 14 is approximately as long as a standard motor vehicle window crevasse. A generally rectangular and fully padded cushion 20 is located on top of the base 12, to the perimeter of which it is permanently attached. The openings in the base 12 are aligned with two openings in the cushion 20 that are approximately the same size and shape. Each of the braces 16 has a rectangular upper end that angularly projects through the openings in the base 12 and into the cushion 20 and a curved lower end.

Figure 2:
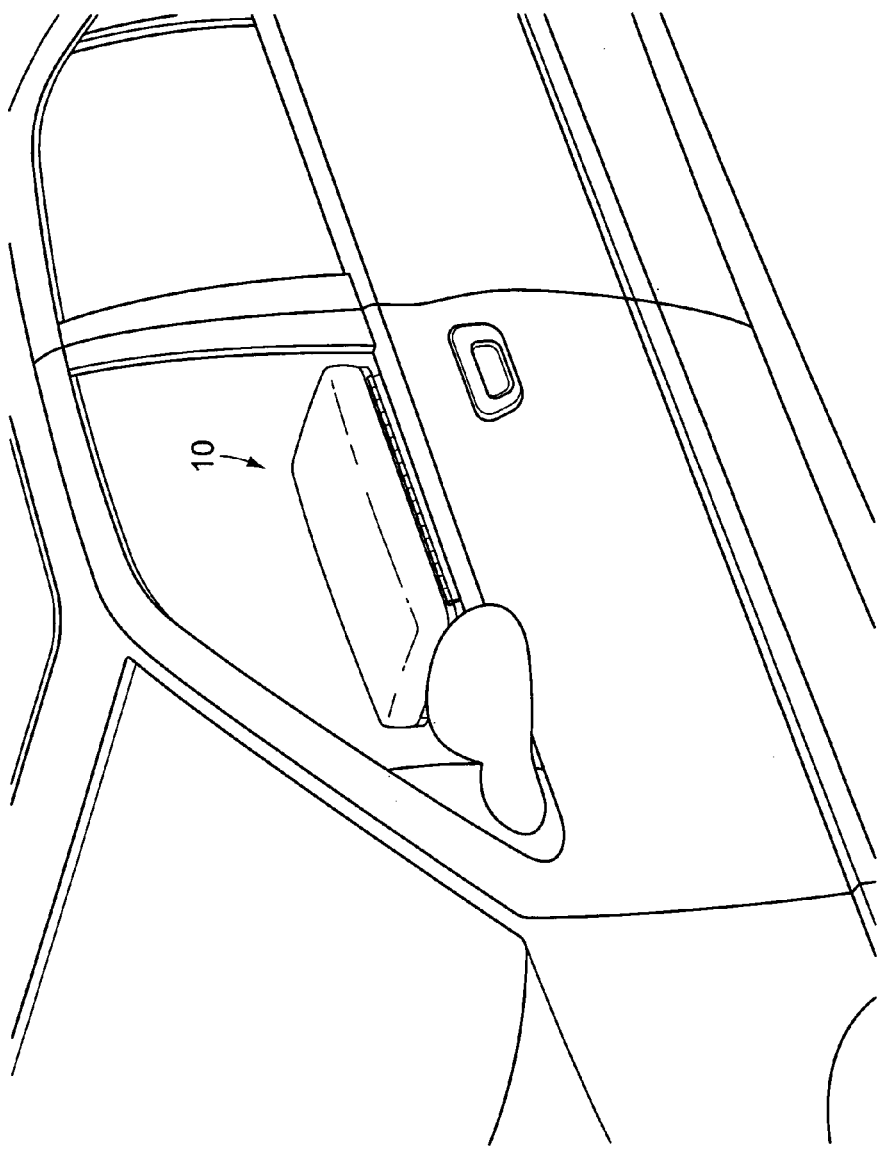
FIG. 2 is a diagrammatic perspective view of the armrest being utilized inside an automobile.

In order to install the armrest 10 as shown in FIG. 2, a user opens a door of an automobile, sits inside the vehicle, closes the door and lowers the window of the door until it is fully recessed in the window crevasse. The user then positions the armrest 10 such that the front edge 22 of the base 12 is closest to him, the left side edge 24 is to his left, the right side edge 28 is to his right and the rear edge 26 is farthest from him. Next, the user inserts the panel 14 into the window crevasse of the door. Since the panel 14 and the window crevasse are approximately the same length, the armrest 10 moves minimally if at all during use. The user lifts up the base 12 until it is approximately perpendicular to the door and pushes the upper end of each brace 16 into the cushion 20 until the curved lower end squarely rests against the door. In order to prevent the braces 16 from sliding out of the cushion 20, the user locks the braces 16 into an extended position. Any one of a wide variety of known mechanisms can be utilized for this purpose, including conventional locking pin combinations. The user can then comfortably rest his arm on the cushion 20, which is specifically designed to relax his arm muscles. The braces 16 amply support the combined weight of the armrest 10 and the arm of the user.

If the user desires to collapse the armrest 10 at any time, such as upon arrival at his destination, he disengages the locking mechanism, slides the braces 16 out of the cushion 20 until they lock into a retracted position and lowers the base 12 until it is adjacent to the interior of the door. The armrest 10 thus conveniently occupies minimal space in its collapsed state. If desired, the user can lift the panel 14 out of the window crevasse and utilize it with a second car door by placing the panel 14 into the window crevasse thereof and following the previously recited installation steps.

In conclusion, herein is presented a collapsible vehicular armrest. The invention is illustrated by example in the drawing figures, and throughout the written description. It should be understood that numerous variations are possible, while adhering to the inventive concept. Such variations are contemplated as being a part of the present invention.

What is claimed is:

1. An armrest for use with a door of a motor vehicle, the door having a window crevasse from which a window can be raised and into which the window can be lowered, the armrest comprising a generally rectangular base, a rear panel, a pair of braces and a cushion, the base having a front edge, a right side edge, a rear edge and a left side edge, the panel having substantially the same length as the window crevasse for inserting thereinto, the cushion being located on top of the base, each brace having a rectangular upper end extending into the cushion and a curved lower end for selectively resting against the door.

2. The armrest as recited in claim 1, further comprising a central hinge connecting the panel to the rear edge of the base.

3. A method of installing an armrest in a door of a motor vehicle having a door having a window crevasse and a window, the armrest comprising a generally rectangular base, a rear panel, a pair of braces and a cushion, the base having a front edge, a right side edge, a rear edge and a left side edge, each brace having a rectangular upper end and a curved lower end, the cushion being located on top of the base, the method comprising the steps of:

lowering the window until it is fully recessed within the window crevasse;

positioning the armrest over the door;

inserting the panel into the window crevasse;

lifting up the base until it is substantially perpendicular to the door;

supporting the base by pushing the lower end of each brace downwardly from the cushion until said lower end rests against the door; and locking the braces into an extended position.

* * * * *